United States Patent [19]

Obrea

[11] Patent Number: 4,785,417
[45] Date of Patent: Nov. 15, 1988

[54] ELECTRONIC POSTAGE METER HAVING AN OUT OF SEQUENCE CHECKING ARRANGEMENT

[75] Inventor: Liana Obrea, Greenwich, Conn.

[73] Assignee: Pitney Bowes Inc., Stamford, Conn.

[21] Appl. No.: 856,555

[22] Filed: Apr. 28, 1986

[51] Int. Cl.$^4$ .................... G06F 11/28; G06F 15/20
[52] U.S. Cl. .................... 364/200; 364/550; 364/464.02; 371/19
[58] Field of Search ............ 364/200, 466, 900, 550; 371/19

[56] References Cited

U.S. PATENT DOCUMENTS

| | | | |
|---|---|---|---|
| 3,626,206 | 12/1971 | Stebins | 371/48 X |
| 3,978,457 | 8/1976 | Check, Jr. et al. | 364/200 |
| 4,097,923 | 6/1978 | Eckert, Jr. et al. | 364/900 |
| 4,118,789 | 10/1978 | Casto et al. | 371/19 X |
| 4,301,507 | 11/1981 | Soderberg et al. | 364/900 X |
| 4,376,299 | 3/1983 | Rivest | 364/900 |
| 4,390,968 | 6/1983 | Hennessy et al. | 364/900 |
| 4,410,938 | 10/1983 | Higashiyama | 364/200 |
| 4,453,210 | 6/1984 | Suzuki et al. | 364/200 |
| 4,484,307 | 11/1984 | Quatse et al. | 364/900 |
| 4,595,981 | 6/1986 | Leung | 371/19 X |
| 4,656,631 | 4/1987 | Nowak | 371/19 |

*Primary Examiner*—Parshotam S. Lall
*Assistant Examiner*—Edward R. Cosimano
*Attorney, Agent, or Firm*—Donald P. Walker; David E. Pitchenik; Melvin J. Scolnick

[57] ABSTRACT

An improved postage meter includes a method for checking the particular operation being carried out by the meter to determine whether it is in the appropriate sequence under the given conditions. A stored program word associated with each routine to be monitored is stored in RAM whenever the routine is operating. The word can be checked as many times as desired during the operation and if a match does not occur between the stored word and the word associated with the executing routine, appropriate error recovery can be initiated.

3 Claims, 3 Drawing Sheets

ELECTRONIC POSTAGE METER HAVING AN OUT OF SEQUENCE CHECKING ARRANGEMENT

BACKGROUND OF THE INVENTION

The invention relates to postage meters and more particularly to electronic postage meters of the type having a microprocessor for controlling the printing of value and accounting for such printing.

Devices of this type are generally known, and are discussed, for example in U.S. Pat. No. 3,978,457. This patent discloses a system for a postal meter which includes a keyboard for the manual introduction of data corresponding to the postage to be printed and a Random Access Memory for real-time operation. Data is stored in a non-volatile memory upon power down and read into the Random Access Memory upon power up. U.S. Pat. No. 4,301,507 discloses an improvement in electronic postage meters having two or more units that are each provided with computer control and further describes the means for providing communication between units as well as with peripheral devices.

U.S. Pat. No. 4,484,307 to Quatze et al issued Nov. 20, 1984 describes a microcomputerized postage meter that provides high degrees of security and fault tolerance. However, the mechanization described includes a means for disabling the meter, which means cannot be reset except by physical access to the meter interior, and which access is only available to authorized personnel at the factory. If the fault condition is present, then even if the microcomputer is powered, the signal prevents the microcomputer from executing instructions.

U.S. Pat. No. 4,710,883 entitled ELECTRONIC POSTAGE METER HAVING A STATUS MONITOR, issued Dec. 1, 1987 and assigned to the assignee of the present application, there is described an improved electronic meter in which a timer, preferrably external to the microcomputer, provides a periodic interruption of the routine being executing. Upon such interruption, the microcomputer shifts to a monitor routine which monitors the meter elements, i.e. any sensors, input and outputs, and determines any changes in the status of these elements. The operating routines are then queued in accordance with the status of the monitored elements. In this improved meter, when abnormalities occur, the meter will not set a fatal error which will require the meter to be taken from service. Instead it has been found desirable that the meter be extremely fault tolerant and that a reset condition be implemented to allow the meter to recover from various abnormalities in operation which previously would reequire the machine to set a fatal error. While this system works well, it has been found that if the program under which the microcomputer is operating were running out of proper sequence because of an unappropriate jump due to a transient for example, errors could be in incurred which would lead to disabling the meter. Thus it was found that it is important to quickly recognize if the program steps were executing in an improper sequence.

Software control arrangements are known in which check words are provided in a stack register. In these programs, a word is placed in a stack register during the execution of a routine and then removed from the stack register as the execution is completed. While this is normally satisfactory, it has been found that in specific cases there is no way to troubleshoot to find whether the operating program is at fault.

Suzuki et al, U.S. Pat. No. 4,453,210 entitled MULTI-PROCESSOR INFORMATION PROCESSING SYSTEM HAVING FAULT DETECTION FUNCTION BASED UPON PERIODIC SUPERVISION OF UPDATED FAULT SUPERVISING CODES describes a program having an additional function to detect faults occurring in various processors of a multi-processor system. A counter is provided for each of the processors for holding an associated fault supervising code. The code stored in the counter is periodically updated by the associated processor while the update status of the code is supervised on a cycle longer than the cycle of the updating period. In accordance with this reference, if a fault occurs in one of the processors, the fault supervising code in correspondence with that processor will not be updated and thus the faulty processor can be detected by periodically noting the update status of the fault supervising codes.

U.S. Pat. No. 3,626,206 to Stebbens entitled CIRCUIT MEANS FOR CYCLICALLY MONITORING AND INDICATING THE CONDITION OF A FUNCTION shows a stepping chain-type digitizer for monitoring the condition of a function and for converting this condition into true and false conditions. These outputs control inhibitor gates in the stages of a normally free running ring counter. Any stage of the ring counter controlled by the step in the selected condition remains in the "on" position after the counter advances to turn it "on", and thereby stops any further advance of the ring counter. The stage of the ring counter which remains locked in the "on" position provides an indication of the conditions of the monitored functions.

SUMMARY OF THE INVENTION

In accordance with the invention described herein, if the postage meter program enters a routine which, under a particular condition, is out of sequence from that which should be operating, there is now provided a method of checking for appropriate operation which also provides an easy access for determining the source of the error. In accordance with the invention, a stored program word is associated with each routine to be monitored and whenever that routine is executed, the corresponding word from the program is stored in the random access memory where it may be checked as many times as desired during the course of execution of the routine. If the comparison of the words shows them to be different, then an error may be signaled and/or an error recovery routine can be initiated.

BRIEF DESCRIPTION OF THE DRAWINGS

In order that the invention will be more clearly understood, it will now be described in greater detail in conjunction with the drawing, wherein.

DETAILED DESCRIPTION OF THE INVENTION

Figure 1:
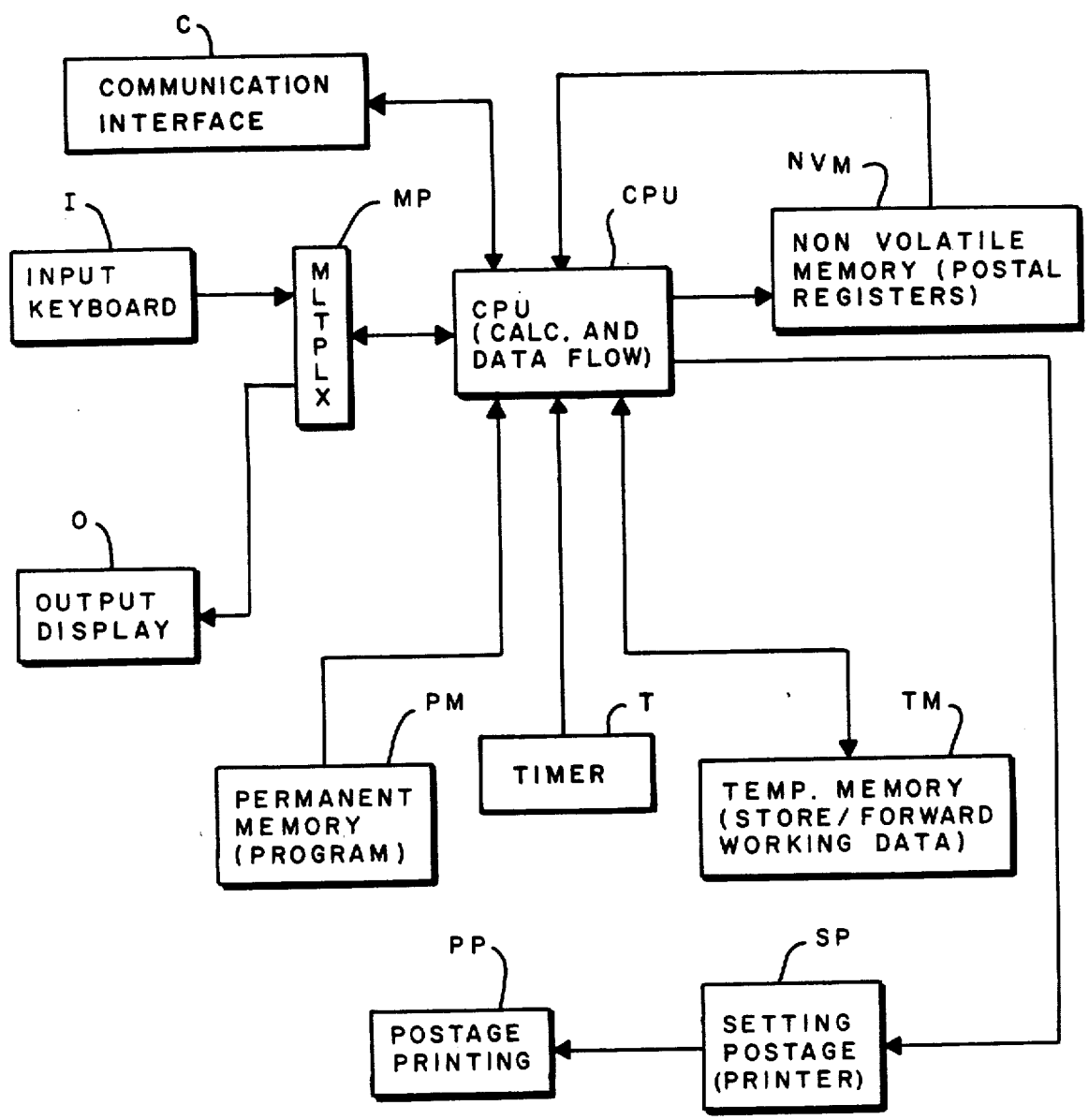
FIG. 1 is a block diagram of a postal meter which may incorporate the system of the present invention.

FIG. 1 is a block diagram of an electronic postal meter incorporating the invention. Suitable meters of the type in which the invention may be utilized are described in U.S. Pat. Nos. 3,978,457 and 4,301,507, the disclosures of which are specifically incorporated by reference. Another particularly suitable arrangement is described in co-pending application Ser. No. 701,802 filed Mar. 12, 1985 entitled POSTAGE METER WITH NON-VOLATILE MEMORY SECURITY CIRCUIT and assigned to the Assignee of the present application.

A central processing unit, CPU, controls the calculations and data flow in the meter under control of a ROM (PM). Data and commands are read from the input keyboard (I) and other data may be displayed (O) as requested on a display in conventional manner through multiplexer (MP). Additionally as described in U.S. Pat. No. 4,301,507 data and commands may be received from and transmitted to other units through a communications interface shown at "C". Real-time accounting is accomplished in a random access memory (RAM) shown at TM with sensitive data being transferred to an NVM or a plurality of NVM's (indicated at SP). The CPU also communicates commands for setting printwheels and for printing of postage (indicated at PP) under the control of the program in the rom (TM). In co-pending application Ser. No. 710,898 filed Mar. 12, 1985 and assigned to the Assignee of the present application, there is described an advantageous routine for the control of the operation of the postage meter. In this improved postage meter, the external timer circuit T is incorporated to provide a periodic interrupt signal to the CPU. The external timer maybe any conventional clock circuit, suitably crystal controlled, to provide an output signal, conveniently at every 2.5 milliseconds to interrupt the routine being executed by the CPU. The status of all elements of the meter is monitored during this interrupt and the various tasks to be done by the meter are queued in an appropriate order. The interrupted routine then reacquires control of the microcomputer.

Figure 2A:
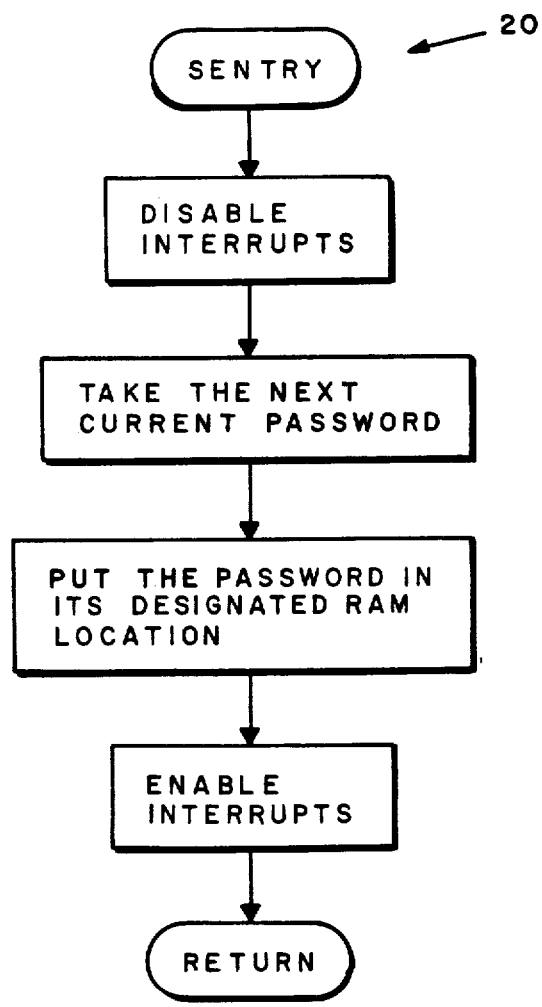
FIG. 2A and B comprise a flow chart illustrating a suitable checking routine in accordance with the invention for use in the electronic postage meter.
Figure 2B:
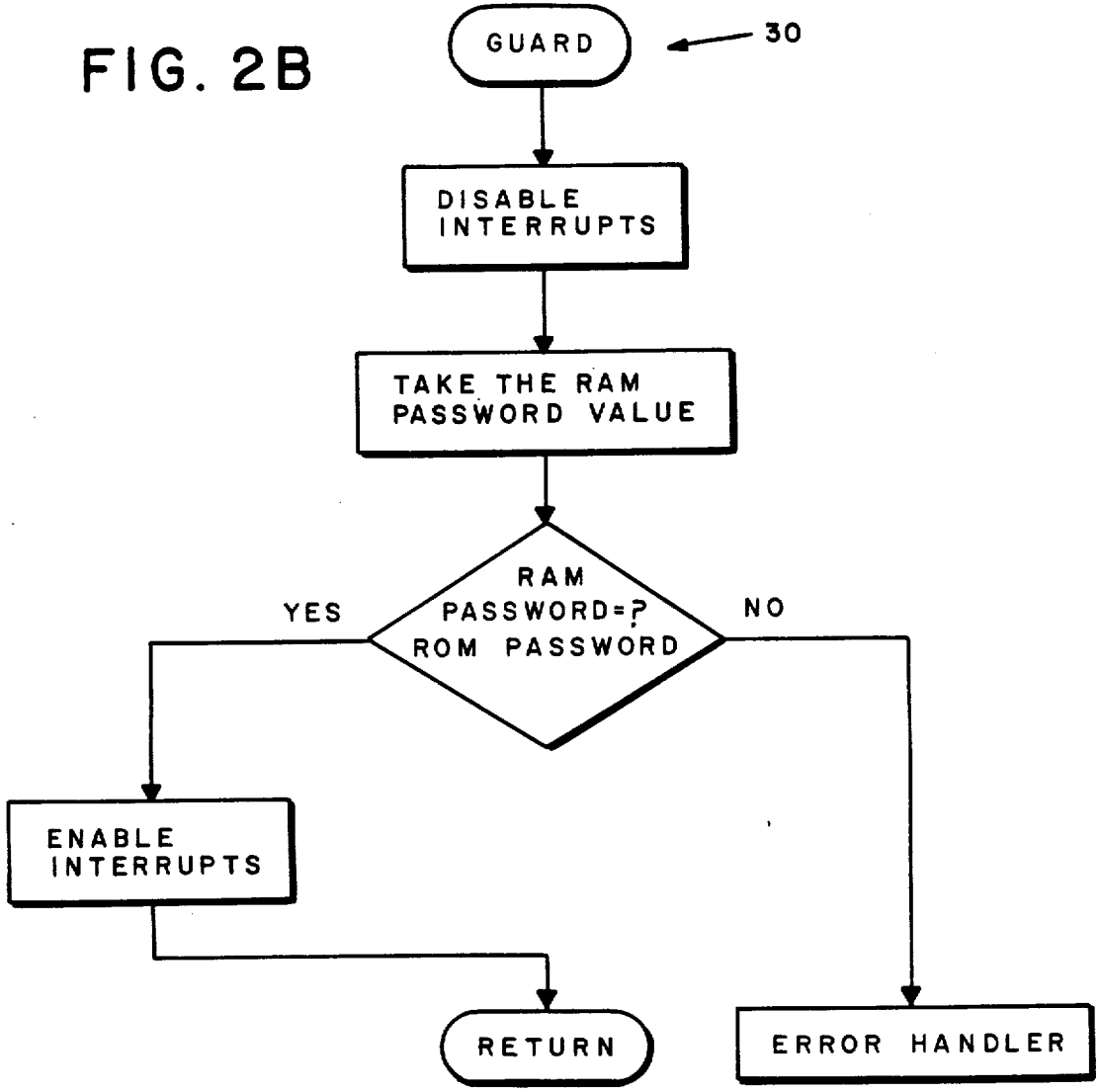

A flow chart for implementing the routine in accordance with the invention is shown in FIGS. 2A and 2B. Preferably the word to be placed in RAM is a 1 byte value, therefore 255 words are available for the monitoring routine.

Figure 3:
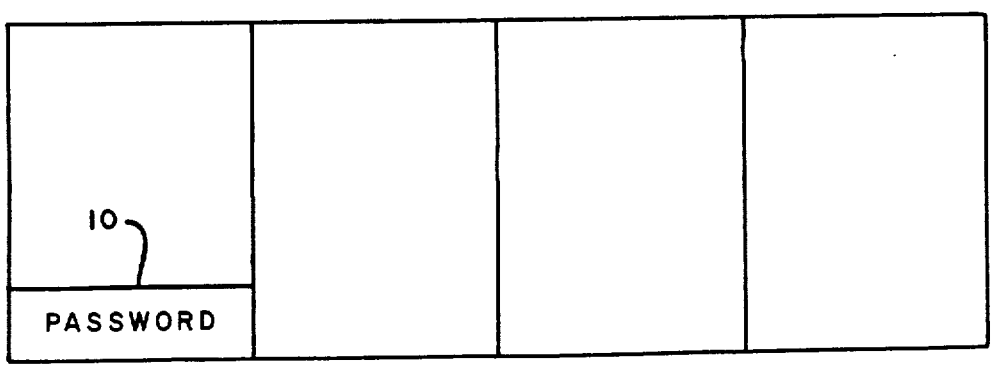
FIG. 3 is a schematic diagram of a memory map of RAM.

With the SENTRY routine 20 shown in FIG. 2A, the maskable interrupts are disabled in conventional manner and the current password is placed in the designated RAM location 10 as shown in FIG. 3 before the tested piece of software is executed. That is, the password stored in the RAM location 10 becomes the expected password associated with the next software routine. The interrupts are then enabled and the program returns to its normal execution. As best seen in FIG. 2B, the running program then has inserted into the program steps as many password checks as are desired. The flow chart 30 for this sequence of program steps is shown as GUARD. In operation then this program takes the RAM password value and compares it with the password in the read only memory and if the comparison is true the interrupts are reenabled and the program returns to its normal operation. However, if the passwords do not match then the error handler routine is called.

Thus in operation, when the program is running out of a sequence, the first encountered check point signals the difference between the expected passwords, that is, the one which has been placed in RAM and the one found embedded in the current running routine by calling an error or error recovery procedure. As the check point is passed, the expected password which is the data now in RAM as opposed to that of a stack register, is checked against immediate data which is embedded in the current running software which of course remains constant in the read only memory.

This method of enabling the system to monitor its own performance continuingly by checking the system control flow with a data byte in ROM being checked with the word in RAM will enhance the system fault tolerance in an electronic postage meter, even in the present of software errors. Thus, it will be appreciated that an electronic postage meter has been provided such that the system fault tolerance is significantly increased.

What is claimed is:

1. A method for assuring that a microcomputerized electronic postage meter having a random access memory and a program memory is operating an appropriate selectable routine from said program memory, the method comprising the steps of:
   (a) providing a predetermined computer word in program memory in correspondence with a selectable routine;
   (b) storing said computer word in the random access memeory whenever said selectable routine is executed;
   (c) comparing said word stored in random access memory at least once during the execution of said selectable routine with said predetermined computer word corresponding to the selectable routine; and
   (d) providing an error indication for further processing by the electronic postage meter whenever the compared words differ.

2. The method of claim 1 wherein the computer word is one byte in length.

3. A method for assuring that a microcomputerized electronic postage meter having a random access memory and a program memory is operating an appropriate selectable routine from said program memory, the method comprising the steps of:
   (a) providing a first and a second predetermined computer word in program memory in correspondence with respective selectable routines;
   (b) storing in random access memory the computer word corresponding to the selected routine whenever one of said selectable routines is executed;
   (c) comparing said word stored in random access memory at least once during the execution of said selectable routine with the corresponding computer word associated with the routine in program memory; and
   (d) providing an error indication for further processing by the electronic postage meter whenever the compared words differ.

* * * * *